United States Patent
Srinivas et al.

(10) Patent No.: US 7,482,480 B2
(45) Date of Patent: *Jan. 27, 2009

(54) PROCESS FOR THE PREPARATION OF HYDROCARBON FUEL

(75) Inventors: Darbha Srinivas, Pune (IN); Rajendra Srivastava, Pune (IN); Paul Ratnasamy, Pune (IN)

(73) Assignee: Council of Scientific & Industrial Research, Nel Delhi (IN)

( * ) Notice: Subject to any disclaimer, the term of this patent is extended or adjusted under 35 U.S.C. 154(b) by 194 days.

This patent is subject to a terminal disclaimer.

(21) Appl. No.: 11/394,138

(22) Filed: Mar. 30, 2006

(65) Prior Publication Data

US 2007/0083056 A1  Apr. 12, 2007

(30) Foreign Application Priority Data

Oct. 10, 2005  (IN) .................. 2722/DEL/2005

(51) Int. Cl.
*C11C 1/00* (2006.01)
(52) U.S. Cl. ...................... 554/167; 554/174
(58) Field of Classification Search ........................ None
See application file for complete search history.

(56) References Cited

U.S. PATENT DOCUMENTS 5,578,090 A   11/1996  Bradin
5,713,965 A   2/1998   Foglia et al.
6,015,440 A   1/2000   Noureddini
6,398,707 B1  6/2002   Wu et al.
6,399,800 B1  6/2002   Haas et al.
6,479,689 B1  11/2002  Tojo et al.
6,642,399 B2  11/2003  Boocock
6,696,583 B2  2/2004   Koncar et al.
6,712,867 B1  3/2004   Boocock
6,768,015 B1  7/2004   Luxem et al.
6,822,105 B1  11/2004  Luxem et al.
6,835,858 B1  12/2004  De Jonge et al.
6,855,838 B2  2/2005   Haas et al.
7,211,681 B2  5/2007   Furuta
2005/0027137 A1  2/2005  Hooker
2007/0004599 A1  1/2007  Srinivas et al.
2007/0083062 A1  4/2007  Srinivas et al.
2007/0093380 A1  4/2007  Srinivas et al.
2007/0167642 A1  7/2007  Oku et al.

FOREIGN PATENT DOCUMENTS

WO    00/05327     2/2000
WO    2004/048311  6/2004

*Primary Examiner*—Deborah D Carr
(74) *Attorney, Agent, or Firm*—Meyertons, Hood, Kivlin, Kowert & Goetzel, P.C.; Eric B. Meyertons

(57) ABSTRACT

The present invention provides a process for the preparation of hydrocarbon fuels, which comprises contacting fatty acid glycerides with alcohols in the presence of a solid, double metal cyanide catalyst at a temperature in the range of 150° to 200° C. for a period of 2-6 hrs and separating the catalyst from the above said reaction mixture to obtain the desired hydrocarbon fuel.

11 Claims, No Drawings

PROCESS FOR THE PREPARATION OF HYDROCARBON FUEL

FIELD OF THE INVENTION

The present invention relates to a process for the preparation of hydrocarbon fuels. More particularly, it relates to an efficient process for producing hydrocarbon fuel, which comprises contacting fatty acid glycerides with alcohols in the presence of a solid, double metal cyanide catalyst.

The solid, double metal cyanide catalyst, used in the present invention is described and disclosed in our co-pending Indian patent application No. 2723/DEL/2005.

BACKGROUND OF THE INVENTION

In recent years there has been a renewed interest in alternatives to petroleum-based fuels. The alternative fuels must be technically acceptable, economically competitive, environmentally acceptable and easily available. The need for these fuels arises mainly from the standpoint of preserving global environment and concern about long-term supplies of conventional hydrocarbon based fuels. Among the different possible sources, diesel fuels derived from trigycerides (vegetable oil/animal fat) present a promising alternative. Although triglycerides can fuel diesel engines their viscosities and poor cold flow properties have led to investigation of various derivatives. Fatty acid methyl esters derived from trigycerides and methanol known as bio-diesel, have received the most attention. Vegetable oils are widely available from a variety of sources. Unlike hydrocarbon-based fuels, the sulfur content of vegetable oils is close to zero and hence the environmental damage caused by sulphuric acid is reduced.

The main advantages of using bio-diesel are its renewability, better quality exhaust gas emission, its biodegradability and given that all the organic carbon present is photosynthetic in origin, it does not contribute to a rise in the level of $CO_2$ in the atmosphere and consequently to the greenhouse effect. Several processes for transesterification of triglycerides have been developed: (1) Base-catalyzed transesterification of glycerides with alcohol (catalysts—alkaline metal alkoxides and hydroxides as well as sodium and potassium carbonates), (2) Direct acid-catalyzed esterification with alcohol (catalysts—Brönsted acids, preferably sulfonic acid and sulfuric acid), and (3) Conversion of oil to fatty acids and then to alkyl esters with acid catalysis. However, the former route (i.e., base catalyzed reaction) is the most economical and in fact, is in practice in several countries for bio-diesel production (J. Braz. Chem. Soc. Vol. 9, No. 1, Year 1998, pages 199-210; J. Am. Oil. Chem. Soc. Vol. 77, No. 12, Year 2000, pages 1263-1266; Fuel Vol. 77, No. 12, year 1998, pages 1389-1391; Bioresource Tech. Vol. 92, Year 2004, pages 55-64; Bioresource Tech. Vol. 92, Year 2004, pages 297-305; Renewable Sustainable Engery Rev. Vol. 9, Year 2005, pages 363-378). Alkaline metal alkoxides (as $CH_3ONa$ for the methanolysis) are the most active catalysts, since they give very high yields (>98%) of fatty acid alkly esters in short reaction times (30 min) even if they are applied at low molar concentrations (0.5 mol %) (J. Food Composition and Analysis Year 2000, Vol. 13, pages 337-343). However, they require high quality oil and the absence of water, which makes them inappropriate for typical industrial processes (J. Braz. Chem. Soc. Vol. 9, No. 1, Year 1998, pages 199-210). Alkaline metal hydroxides (NaOH and KOH) are cheaper than metal alkoxides but require increasing catalyst concentration (1-2 mol %). NaOH is more superior to KOH as the latter and other alkali hydroxides yield more soponified products than the bio-fuel.

Recently, enzymatic transesterification using lipase has become more attractive for bio-fuel production, since the glycerol produced as a by-product can easily be recovered and the purification of fatty acid esters is relatively simple to accomplish. However, the main hurdle to commercialize this system is the cost of lipase production (J. Mol. Catal. B: Enzymatic Vol. 17, Year 2002, pages 133-142).

Use of immobilized lipases in the synthesis of fatty acid methyl esters from sunflower and soybean oils were reported by Soumanou and Bornscheuer and Watanabe et al (Enzy. Microbiol. Tech. Vol. 33, Year 2003, page 97; J. Mol. Catal. B: Enzymatic Vol. 17, Year 202, pages 151-155). They found that the immobilized enzyme is active at least for 120 h during five batch runs without significant loss of activity. Among the various lipases investigated the enzyme from *Pseudomonas fluorescens* (Amano AK) exhibited the highest conversion of oil. Khare and Nakajima (Food Chem. Vol. 68, Year 2000, pages 153-157) also reported the use of immobilized lipase enzyme.

Cost is the major factor slowing the commercialization of biofuels. Replacement of homogeneous catalyst by a solid catalyst eliminates the processing costs associated with the homogeneous catalysts. Leclercq et al. (J. Am. Oil. Chem. Soc. Vol 78, Year 2001, page 1161) studied the transesterification of rapeseed oil in the presence of Cs-exchanged NaX and commercial hydrotalcite (KW2200) catalysts. At a high methanol to oil ratio of 275 and 22 h reaction time at methanol reflux, the Cs-exchanged NaX gave a conversion of 70% whereas 34% conversion was obtained over hydrotalcite. ETS-4 and ETS-10 catalysts gave conversions of 85.7% and 52.7%, respectively at 220° C. and 1.5 h reaction time (U.S. Pat. No. 5,508,457). Suppes et al (J. Am. Oil. Chem. Soc. Vol. 78, Year 2001, page 139) achieved a conversion of 78% at 240° C. and >95% at 160° C. using calcium carbonate rock as catalyst. Of late, Suppes et al reported the use of Na, K and Cs exchanged zeolite X, ETS-10, NaX occluded with $NaO_x$ and sodium azide in the transesterification of soybean oil with methanol (Appl. Catal. A: Gen. Vol. 257, Year 2004, page 213). Furuta et al (Catal. Commun. Vol. 5, Year 2004, pages 721-723) describe biodiesel production from soybean oil and methanol at 200-300° C. using solid superacid catalysts of sulfated tin and zirconium oxides with oil conversions over 90%. Use of tin complexes immobilized in ionic liquids for vegetable oil alcoholysis was reported by Abreu et al (J. Mol. Catal. A: Chem. Vol. 227, Year 2005, pages 263-267; J. Mol. Catal. A: Chem. Vol. 209, Year 2004, pages 29-33). Kim et al reported the use of heterogeneous base catalysts (Na/NaOH/ $Al_2O_3$) for the methanolysis of vegetable oils U.S. Pat. No. 5,713,965 describes the production of biodiesel, lubricants and fuel and lubricant additives by traneseterification of triglycerides with short chain alcohols in the presence of an organic solvent such as an alkane, arene, chlorinated solvent, or petroleum ether using *Mucor miehei* or *Candida Antarctica*-derived lipase catalyst. Patents Nos. WO 00/05327 A1, WO 02/28811 A1, WO 2004/048311 A1, WO 2005/021697 A1 and WO 2005/016560 A1 and U.S. Pat. Nos. 5,578,090; 6,855,838; 6,822,105; 6,768,015; 6,712,867; 6,642,399; 6,399,800; 6,398,707; 6,015,440, also teach us the production fatty acid alkyl esters using either lipase catalysts or metal ion catalysts. Patent No. WO 2004/085583 A1 describes transesterification of fats with methanol and ethanol in the presence of a solid acid catalyst having ultrastrong-acid properties in a short time at around ordinary pressure.

Production of diesel from pure soybean oil or coconut oil is not economical, so it is desirable to use cheaper alternative feedstocks such as animal fat or used cooked oil or oil from seeds of wild plants like jojoba and jatropha. Animal fat and used oil contain high amounts of free fatty acids (FFA) content. The FFA saponifies with the alkali-based transesterification catalyst leading to low yield, difficulties in separation of the products, and increase in production cost. In those cases a two step process wherein in the first step an acid catalyst esterifies the free fatty acids to methyl esters and in the second step a base catalyst transesterifies the triglycerides is generally employed in diesel preparation. An efficient solid catalyst, which can do this in a single-step is highly desirable.

The present invention deals with a process, which eliminates most of the above said drawbacks. It deals with production of hydrocarbon fuels (diesel oil) which comprises reaction of vegetable oils or fats with C1-C5 alcohols at moderate conditions using a novel, solid, reusable double metal cyanide catalyst. The feedstock oil is a triglyceride or a mixture of fatty acids and glycerides. One of the metals of the double metal cyanide catalyst is $Zn^{2+}$ while the other is a transition metal ion preferably Fe. Co-existence of Zn and Fe in the active site linking through cyano bridges makes it efficient to transform feedstocks containing fatty acids in a single step to fatty acid alkyl esters. The catalyst could be separated easily by centrifugation or by simple filtration and reused. Most importantly, the catalyst is highly efficient and only a small amount (~1 wt % of oil) is needed to carryout the reaction. The process is atom-efficient and the reaction conditions like temperature and pressure are only moderate. Unlike the conventional base catalysts the catalyst of the present invention is more efficient even in the presence of water impurity in oil. Hence, there are no limitations on the quality of oil that should be used with the catalysts of the present invention.

OBJECTIVES OF THE INVENTION

The main objective of the present invention to provide an efficient, reusable heterogenous catalyst and a process for the preparation of hydrocarbon fuels in high yields.

Another object is to provide a single-step process for the production of hydrocarbon fuels from used oils or oils or fats containing significant amount of fatty acids.

Yet another object of the present invention is to produce fuels by transesterification of vegetable oil or fat with a C1-C5 alcohol at moderate conditions and shorter reaction times.

SUMMARY OF THE INVENTION

Accordingly, the present invention provides a process for the preparation of hydrocarbon fuel, which comprises contacting fatty acid glycerides with an alcohol in the presence of a solid, double metal cyanide catalyst, at a temperature in the range of 150-200° C., for a period of 2-6 hrs, cooling the above said reaction mixture to a temperature in the range of 20-35° C., filtering the above said reaction mixture to separate out the catalyst, followed by removing the unreacted alcohol from the resultant filtrate by vacuum distillation to obtain the desired hydrocarbon fuel.

In an embodiment of the present invention the molar ratio of fatty acid glyceride to alcohol used is in the range of 1:6 to 1:12.

In yet another embodiment the concentration of solid, double metal cyanide catalyst used is 1-2 wt % of fatty acid glyceride.

In yet another embodiment the solid, double metal cyanide catalyst used has the molecular formula:

wherein, R is tertiary-butyl, M is a transition metal ion, x varies from 0 to 0.5, y varies from 3-5 and n is 10 or 12.

In yet another embodiment the transition metal ion used is Fe or Co.

In yet another embodiment the hydrocarbon fuel obtained is fatty acid methyl esters.

In yet another embodiment the hydrocarbon fuel obtained is diesel oil.

In yet another embodiment the source of fatty acid glyceride used is vegetable oil or animal fat.

In yet another embodiment the vegetable oil used is selected from the group consisting of coconut oil, sunflower oil, soybean oil, mustered oil, olive oil, cotton seed oil, rapeseed oil, margarine oil, jojoba oil, jatropha oil and mixtures thereof.

In yet another embodiment the alcohol used is selected from the group consisting of methanol, ethanol, propanol, butanol, pentanol and the mixtures thereof.

In yet another embodiment the solid double metal cyanide complex catalyst used is easily separable from the reaction mixture and is reusable in several recycling experiments without significant loss in activity.

In yet another embodiment the mol % conversion of oil or fat to hydrocarbon fuel obtained is in the range of 90-95 mol % based on isolated glycerol yield and the fuel selectivity is greater than 95%.

DETAIL DESCRIPTION OF THE INVENTION

In the investigations leading to the present invention, it was found that the double metal cyanide catalysts are highly efficient and could be easily separated from the products for further reuse. The prior art catalysts, mineral acid, alkali bases and lipases need additional expenses for catalyst separation. An easily separable catalyst system e.g., the catalyst of the present invention is beneficial and leads to an economic and eco-friendly process. Hence, the solid catalysts of the present invention are not only efficient but avoid the tedious process of catalyst recovery characteristic of the prior art processes. The present catalyst system is efficient without using any additional solvent.

The solid, double metal cyanide catalyst has the molecular formula:

where, R is tertiary-butyl, x varies from 0 to 0.5, y varies from 3-5 and n is 10 or 12. The catalyst has the physicochemical characteristics listed in Table 1.

TABLE 1

| Physocochemical characteristics of the double metal cyanide (Fe—Zn) catalyst. | |
|---|---|
| Textural Characteristics: | |
| Total surface area ($S_{BET}$) | 38.4 m$^2$/g |
| External surface area ($S_{Extn.}$) | 24.1 m$^2$/g |
| Micropore area | 14.3 m$^2$/g |
| Average pore diameter | 3.9 nm |
| Total pore volume | 0.037 cc/g |
| Elemental analysis: | |
| % C-content | 23.3 |
| % H-content | 2.24 |
| % N-content | 17.3 |
| Morphology (SEM): | Spherical shaped particles |

TABLE 1-continued

Physocochemical characteristics of the double metal cyanide (Fe—Zn) catalyst.

Spectral characteristics:

| | |
|---|---|
| FT-IR band positions (in cm$^{-1}$) | 2096 (n(C°N)), 1230 (n(C—O)), 500 (n(Fe—C)) |
| Diffuse reflectance UV-visible bands (in nm) | 405, 330, 278, 236 and 208 |

The catalyst of the present invention is prepared as described in EXAMPLE 1 by reacting an aqueous $ZnCl_2$ solution, an aqueous $K_4Fe(CN)_6$ solution and a tri-block copolymer poly(ethylene glycol)-block-poly(propylene glycol)-block-poly(ethylene glycol) ($EO_{20}$-$PO_{70}$-$EO_{20}$; molecular weight of about 5800) dissolved in tert.-butanol at ambient conditions (25-40° C.) and activating at 170-200° C.

In still yet another embodiment, the concentration of said catalyst in the reaction mixture is 1-2 wt % of oil.

It is a feature of the process of the present invention that it eliminates the saponification. It is another feature of the process of present invention that the catalyst is a solid and the reaction takes place in a heterogeneous condition, the product fuel is a liquid and the solid catalyst can be easily separated from products by centrifugation/filtration for further reuse. In still yet another feature, the reaction is conducted without using any solvent.

The present invention is illustrated herein below with examples, which are illustrative only and should not be construed to limit the scope of the present invention in any manner.

EXAMPLE 1

This example illustrates the preparation of the Fe—Zn double metal cyanide catalyst of the present invention. In a typical catalyst preparation, $K_4[Fe(CN)_6]$ (0.01 mol) was dissolved in double distilled water (40 ml) (Solution-1). $ZnCl_2$ (0.1 mol) was dissolved in a mixture of distilled water (100 ml) and tertiary-butanol (20 ml) (Solution)-2. Poly(ethylene glycol)-block-poly(propylene glycol)-block-poly(ethylene glycol) ($EO_{20}$-$PO_{70}$-$EO_{20}$; molecular weight of about 5800) (15 g) was dissolved in a mixture of 2 ml of distilled water and 40 ml of tertiary-butanol (Solution-3). Solution-2 was added to solution-1 over 60 min at 50° C. with vigorous stirring. White precipitation occurred during the addition. Then, solution-3 was added to the above reaction mixture over a period of 5 min and stirring was continued for further 1 h. The solid cake formed was filtered, washed with distilled water (500 ml) and dried at 25° C. for 2-3 days. This material was activated at 180-200° C. for 4 h prior to using it in the reactions.

EXAMPLE 2

This example describes the preparation of fatty acid methyl esters (diesel oil) from coconut oil and methanol. In a typical reaction, coconut oil (5 g), methanol (oil:methanol molar ratio=1:6) and double metal cyanide Fe—Zn catalyst (50 mg; 1 wt % of oil) were charged into a 100 ml stainless steel autoclave having a teflon-liner. The autoclave was closed and placed placed in a rotating synthesis reactor (Hiro Co., Japan, Mode-KH 02; rotating speed=30 rpm) and the reaction was conducted at autogeneous pressure at 170° C. for 4 h. It was then allowed to cool to 25° C.

First, catalyst was separated by centrifugation/filtration from the reaction mixture. Then, by vacuum distillation unreacted alcohol in the reaction mixture was removed. Pet ether (60 ml) and methanol (20 ml) were added to separate out the glycerol by-product from the reaction mixture. The methanol layer containing glycerol by-product was separated. This process of glycerol separation was repeated 2-3 times. Glycerol was isolated by distilling out methanol under vacuum. Later, the ether portion was distilled out to obtained the esterified products. A portion of the esterified products (100 mg) was diluted with dichloromethane (1 g) for analysis by gas chromatography. The products were identified by GC-MS.

EXAMPLE 3

This example illustrates the preparation of fatty acid methyl esters (diesel oil) from sunflower oil and methanol. In a typical reaction, sunflower oil (5 g), methanol (oil:methanol molar ratio=1:6) and double metal cyanide Fe—Zn catalyst (50 mg; 1 wt % of oil) were charged into a 100 ml stainless steel autoclave having a teflon-liner. The autoclave was closed and placed in a rotating synthesis reactor (Hiro Co., Japan, Mode-KH 02; rotating speed=30 rpm) and the reaction was conducted at autogeneous pressure at 170° C. for 4 h. It was then allowed to cool to 25° C. The products were isolated by distillation in vacuum.

EXAMPLE 4

This example describes the preparation of fatty acid methyl esters (diesel oil) from soybean oil and methanol. In a typical reaction, soybean oil (5 g), methanol (oil:methanol molar ratio=1:6) and double metal cyanide Fe—Zn catalyst (50 mg; 1 wt % of oil) were charged into a 100 ml stainless steel autoclave having a teflon-liner. The autoclave was then placed in a rotating synthesis reactor (Hiro Co., Japan, Mode-KH 02; rotating speed=30 rpm) and the reaction was conducted at autogeneous pressure at 170° C. for 4 h. It was then allowed to cool to 25° C. The products were isolated by distillation in vacuum.

EXAMPLE 5

This example describes the preparation of fatty acid methyl esters (diesel oil) from margarine oil and methanol. In a typical reaction, margarine oil (5 g), methanol (oil:alcohol molar ratio=1:6) and double metal cyanide Fe—Zn catalyst (50 mg; 1 wt % of oil) were charged into a 100 ml stainless steel autoclave having a teflon-liner. The autoclave was then placed in a rotating synthesis reactor (Hiro Co., Japan, Mode-KH 02; rotating speed=30 rpm) and the reaction was conducted at autogeneous pressure at 170° C. for 4 h. It was then allowed to cool to 25° C. The products were isolated by distillation in vacuum.

EXAMPLE 6

This example describes the preparation of fatty acid methyl esters (diesel oil) from used/cooked margarine oil and methanol. In a typical reaction, used/cooked margarine oil (5 g), methanol (oil:alcohol molar ratio=1:6) and double metal cyanide Fe—Zn catalyst (50 mg; 1 wt % of oil) were charged into a 100 ml stainless steel autoclave having a teflon-liner. The autoclave was then placed in a rotating synthesis reactor (Hiro Co., Japan, Mode-KH O₂; rotating speed=30 rpm) and the reaction was conducted at autogeneous pressure at 170° C. for 4 h. It was then allowed to cool to 25° C. The products were isolated by distillation in vacuum.

EXAMPLE 7

This example describes the preparation of fatty acid alkyl esters (hydrocarbon fuel) from coconut oil and butanol. In a typical reaction, margarine oil (5 g), butanol (oil:alcohol molar ratio=1:6) and double metal cyanide Fe—Zn catalyst (50 mg; 1 wt % of oil) were charged into a 100 ml stainless steel autoclave having a teflon-liner. The autoclave was then placed in a rotating synthesis reactor (Hiro Co., Japan, Mode-KH 02; rotating speed=30 rpm) and the reaction was conducted at autogeneous pressure at 170° C. for 4 h. It was then allowed to cool to 25° C. The products were isolated by distillation in vacuum.

EXAMPLE 8

This example describes the preparation of hydrocarbon fuel from sunflower oil and butanol. In a typical reaction, sunflower oil (5 g), butanol (oil:alcohol molar ratio=1:6) and double metal cyanide Fe—Zn catalyst (50 mg; 1 wt % of oil) were charged into a 100 ml stainless steel autoclave having a teflon-liner. The autoclave was sealed and placed in a rotating synthesis reactor (Hiro Co., Japan, Mode-KH 02; rotating speed=30 rpm) and the reaction was conducted at autogeneous pressure 170° C. for 4 h. It was then allowed to cool to 25° C. The products were isolated by distillation in vacuum.

EXAMPLE 9

This example illustrates the preparation of hydrocarbon fuel from margarine oil and propanol or butanol. In a typical reaction, margarine oil (5 g), propanol or butanol (oil:alcohol molar ratio=1:6) and double metal cyanide Fe—Zn catalyst (50 mg; 1 wt % of oil) were charged into a 100 ml stainless steel autoclave having a teflon-liner. The autoclave was closed and placed in a rotating synthesis reactor (Hiro Co., Japan, Mode-KH 02; rotating speed=30 rpm) and the reaction was conducted at autogeneous pressure at 170° C. for 4 h. It was then allowed to cool to 25° C. The products were isolated by distillation in vacuum. TABLE-2 lists the results of catalytic activity studies exemplified in EXAMPLES 2-9.

ADVANTAGES

1. The process has the combined unique advantages of high conversion accompanied with high selectivity for hydrocarbon fuels.
2. The catalyst can be easily separated from the product mixture and no issues related to saponification are encountered.
3. The catalyst of the present invention is highly efficient for the preparation of hydrocarbon fuel from vegetable oil or fat and C1-C5 alcohols.

We claim:

1. A process for the preparation of hydrocarbon fuel, which comprises contacting fatty acid glycerides with an alcohol in the presence of a solid, double metal cyanide catalyst, at a temperature in the range of 150-200° C., for a period of 2-6 hrs, cooling the above said reaction mixture to a temperature in the range of 20-35° C., filtering the above said reaction mixture to separate out the catalyst, followed by removing the unreacted alcohol from the resultant filtrate by vacuum distillation to obtain the desired hydrocarbon fuel.

2. A process according to claim 1, wherein the molar ratio of fatty acid glyceride to alcohol used is in the range of 1:6 to 1:12.

3. A process according to claim 1, wherein the concentration of solid, double metal cyanide catalyst used is 1-2 wt % of fatty acid glyceride.

4. A process according to claim 1, wherein the solid, double metal cyanide catalyst used has a molecular formula:

$$Zn_3M_3(CN)_n(ROH).xZnCl_2.yH_2O$$

wherein, R is tertiary-butyl, M is a transition metal ion, x varies from 0 to 0.5, y varies from 3-5 and n is 10 or 12.

5. A process according to claim 4, wherein the transition metal ion used is selected from Fe, Co and Cr.

6. A process according to claim 1, wherein the hydrocarbon fuel obtained is diesel oil.

7. A process according to claim 1, wherein the source of fatty acid glyceride used is vegetable oil or animal fat.

8. A process according to claim 7, the vegetable oil used is selected from the group consisting of coconut oil, sunflower oil, soybean oil, mustered oil, olive oil, cotton seed oil, rapeseed oil, margarine oil, jojoba oil, jatropha oil and mixtures thereof.

TABLE 2

Hydrocarbon fuel preparation: catalytic activity of double metal cyanides

| Example No. | Oil | Alcohol | Oil conversion base on isolated glycero yield (mol %) | Alkyl esters selectivity (mol %) |
|---|---|---|---|---|
| Example 2 | Coconut oil | Methanol | 92.5 | Methyl caprilic ester (8.7%) + Methyl capric ester (5.8) + Methyl lauric ester (45.6) + methyl myristic ester (18.4) + Methyl Palmitic ester (7.9%) + Methyl (oleate + stereate + linoleate) esters (13.7) |
| Example 3 | Sunflower oil | Methanol | 92.3 | Methyl Palmitic ester (6.8%) + Methyl (oleate + stereate + linoleate) esters (92.0) |
| Example 4 | Soybean oil | Methanol | 92.0 | Methyl esters (99%) |
| Example 5 | Margarine | Methanol | 93.0 | Methyl palmitate (10.1%) + Methyl (oleate + stereate + linoleate) esters (88.2) |
| Example 6 | Used/Cooked margarine | Methanol | 92.8 | Methyl palmitate (10%) + Methyl (oleate + stereate + linoleate) esters (88.0) |
| Example 7 | Coconut oil | Butanol | 92.0 | Butyl caprilic ester (9.5%) + Butyl capric ester (8.0) + Butyl lauric ester (45.1) + Butyl myristic ester (19.6) + Butyl palmitic ester (9.2%) + Bytyl (oleate + stereate + linoleate) esters (8.3) |
| Example 8 | Sunflower oil | Butanol | 91.0 | Butyl palmitic ester (8.7%) + Butyl (oleate + stereate + linoleate) esters (91.1) |
| Example 9 | Margarine | Propanol | 93.7 | Propyl palmitate (12.7%) + Propyl (oleate + stereate + linoleate) esters (86.5) |
| Example 9 | Margarine | Butanol | 92.1 | Butyl palmitate (13.5%) + Butyl (oleate + stereate + linoleate) esters (86.0) |

9. A process according to claim 1, wherein the alcohol used is selected from the group consisting of methanol, ethanol, propanol, butanol, pentanol and the mixtures thereof.

10. A process according to claim 1, wherein the solid double metal cyanide complex catalyst used is easily separable from the reaction mixture and is reusable in several recycling experiments without significant loss in activity.

11. A process according to claim 1, wherein the mol % conversion of oil or fat to hydrocarbon fuel obtained is in the range of 90-95 mol % based on isolated glycerol yield and the fuel selectivity is greater than 95%.

* * * * *